US012443513B2

(12) United States Patent
Mishra et al.

(10) Patent No.: US 12,443,513 B2
(45) Date of Patent: Oct. 14, 2025

(54) GENERATING TEST CASES FOR SOFTWARE TESTING USING MACHINE LEARNING TECHNIQUES

(71) Applicant: Dell Products L.P., Round Rock, TX (US)

(72) Inventors: Abhishek Mishra, Bangalore (IN); Vivek Bhargava, Bangalore (IN); Kumar Saurav, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 336 days.

(21) Appl. No.: 18/229,247

(22) Filed: Aug. 2, 2023

(65) Prior Publication Data

US 2025/0045189 A1 Feb. 6, 2025

(51) Int. Cl.
*G06F 11/3668* (2025.01)
*G06N 20/00* (2019.01)

(52) U.S. Cl.
CPC ......... *G06F 11/3684* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 10,162,740 B1 | 12/2018 | Setty et al. | |
| 10,768,893 B2 * | 9/2020 | Misra | G06F 11/3676 |
| 10,824,549 B1 * | 11/2020 | Desphande | G06F 11/3688 |
| 11,226,892 B2 | 1/2022 | Kochura et al. | |
| 11,720,482 B1 * | 8/2023 | Chauhan | G06F 11/3692 717/124 |
| 2018/0267887 A1 * | 9/2018 | Dsouza | G06F 11/3688 |
| 2019/0196949 A1 * | 6/2019 | Venkataraman | G06F 11/3476 |
| 2020/0082034 A1 * | 3/2020 | Sholingar | G06F 11/3698 |
| 2020/0117583 A1 * | 4/2020 | Durairaj | G06F 11/3692 |
| 2020/0118546 A1 * | 4/2020 | Cimo | G10L 15/22 |
| 2022/0035728 A1 * | 2/2022 | Muras | G06F 40/216 |
| 2022/0091968 A1 * | 3/2022 | Kumar | G06F 11/3698 |

(Continued)

OTHER PUBLICATIONS

Durelli et al., "Machine Learning Applied to Software Testing: A Systematic Mapping Study," IEEE, 2019. (Year: 2019).*

(Continued)

*Primary Examiner* — Ryan D. Coyer
(74) *Attorney, Agent, or Firm* — Ryan, Mason & Lewis, LLP

(57) ABSTRACT

Methods, apparatus, and processor-readable storage media for generating test cases for software testing using machine learning techniques are provided herein. An example computer-implemented method includes obtaining user input data associated with at least one software application; identifying one or more predetermined types of information, including one or more of topic-related information and entity-related information, from at least a portion of the user input data using at least a first set of one or more machine learning techniques; generating one or more test cases for testing at least a portion of the at least one software application by processing at least a portion of the identified information using at least a second set of one or more machine learning techniques; and performing one or more automated actions based at least in part on at least one of the one or more generated test cases.

20 Claims, 7 Drawing Sheets

(56) References Cited

U.S. PATENT DOCUMENTS

2022/0350733 A1* 11/2022 Vasavan ............. G06F 11/3692
2023/0251960 A1*  8/2023 Sharma .................... G06N 5/04
                                                               717/124
2024/0303185 A1*  9/2024 Boué ...................... G06N 20/00

OTHER PUBLICATIONS

Lam et al., "iDFlakies: A Framework for Detecting and Partially Classifying Flaky Tests," IEEE, 2019. (Year: 2019).*
Wei et al., "Automatically Tagging the "AAA" Pattern in Unit Test Cases Using Machine Learning Models," IEEE, 2023. (Year: 2023).*
Dwarakanath et al., Litmus: Generation of Test Cases from Functional Requirements in Natural Language, NLDB 2012, LNCS 7337, pp. 58-69, 2012.

* cited by examiner

```
# Step 1: Preprocessing
# Clean and preprocess the user stories and acceptance criteria
def preprocess_text(text):
    # Perform text cleaning (remove special characters, etc.)
    cleaned_text = perform_text_cleaning(text)
    # Tokenize the text into individual words
    tokens = tokenize_text(cleaned_text)
    return tokens

# Step 2: Part-of-Speech (POS) Tagging
# Assign grammatical parts of speech to each word in the text
def perform_pos_tagging(tokens):
    pos_tags = assign_pos_tags(tokens)
    return pos_tags

# Step 3: Dependency Parsing
# Extract relationships between words in the text (e.g., subject-verb-object)
def perform_dependency_parsing(tokens):
    dependencies = extract_dependencies(tokens)
    return dependencies

# Step 4: Keyword Extraction
# Identify important keywords and phrases in the text
def extract_keywords(tokens):
    keywords = find_keywords(tokens)
    return keywords

# Step 5: Word Embeddings
# Generate word embeddings to represent words in a high-dimensional vector space
def generate_word_embeddings(tokens):
    word_embeddings = create_word_embeddings(tokens)
    return word_embeddings
```

```
# Step 1: Preprocessing
# Perform text cleaning and tokenization on user stories and acceptance criteria
preprocessed_user_stories = preprocess(user_stories)
preprocessed_acceptance_criteria = preprocess(acceptance_criteria)

# Step 2: NLP Model Initialization and Fine-Tuning
nlp_model = initialize_nlp_model()
nlp_model.fine_tune(training_data)  # Fine-tune the model on labeled training data (user stories and associated test cases)

# Step 3: Generate Test Cases
def generate_test_cases(user_story, acceptance_criteria, nlp_model):
    # Extract relevant information from the user story and acceptance criteria using NLP model
    extracted_info = nlp_model.extract_information(user_story, acceptance_criteria)
    # Generate test cases based on the extracted information
    test_cases = []
    for scenario in extracted_info:
        test_case = construct_test_case(scenario)
        test_cases.append(test_case)
    return test_cases

# Step 4: Test Case Execution
def execute_test_cases(test_cases):
    for test_case in test_cases:
        # Execute the test case on the application and record the results
        result = execute_test_case(test_case)
        test_case.result = result

# Step 5: Output Test Cases
def output_test_cases(test_cases):
    for idx, test_case in enumerate(test_cases):
        print(f"Test Case {idx + 1}:")
        print(f"Description: {test_case.description}")
        print("Steps:")
        for step_idx, step in enumerate(test_case.steps):
            print(f"{step_idx + 1}. {step}")
        print(f"Expected Outcome: {test_case.expected_outcome}\n")
```

FIG. 4

GENERATING TEST CASES FOR SOFTWARE TESTING USING MACHINE LEARNING TECHNIQUES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Software development commonly includes the task of generating test cases. Conventional software development approaches, however, typically include writing test cases using time-consuming and error-prone techniques, which can result in missed defects and delays in software delivery. Additionally, such techniques can result in test cases which may not cover a sufficient number of possible scenarios, which can lead to inadequate testing and reduced software quality.

SUMMARY

Illustrative embodiments of the disclosure provide techniques for generating test cases for software testing using machine learning techniques.

An exemplary computer-implemented method includes obtaining user input data associated with at least one software application, and identifying one or more predetermined types of information, including one or more of topic-related information and entity-related information, from at least a portion of the user input data using at least a first set of one or more machine learning techniques. The method also includes generating one or more test cases for testing at least a portion of the at least one software application by processing at least a portion of the identified information using at least a second set of one or more machine learning techniques. Further, the method includes performing one or more automated actions based at least in part on at least one of the one or more generated test cases.

Illustrative embodiments can provide significant advantages relative to conventional software development approaches. For example, problems associated with time-consuming and error-prone techniques are overcome in one or more embodiments through automatically generating one or more software application test cases using machine learning techniques.

These and other illustrative embodiments described herein include, without limitation, methods, apparatus, systems, and computer program products comprising processor-readable storage media.

BRIEF DESCRIPTION OF THE DRAWINGS

FIG. 2 shows example pseudocode for natural language processing-based (NLP-based) information extraction in an illustrative embodiment.

FIG. 4 shows example pseudocode for generating test cases using an NLP model in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
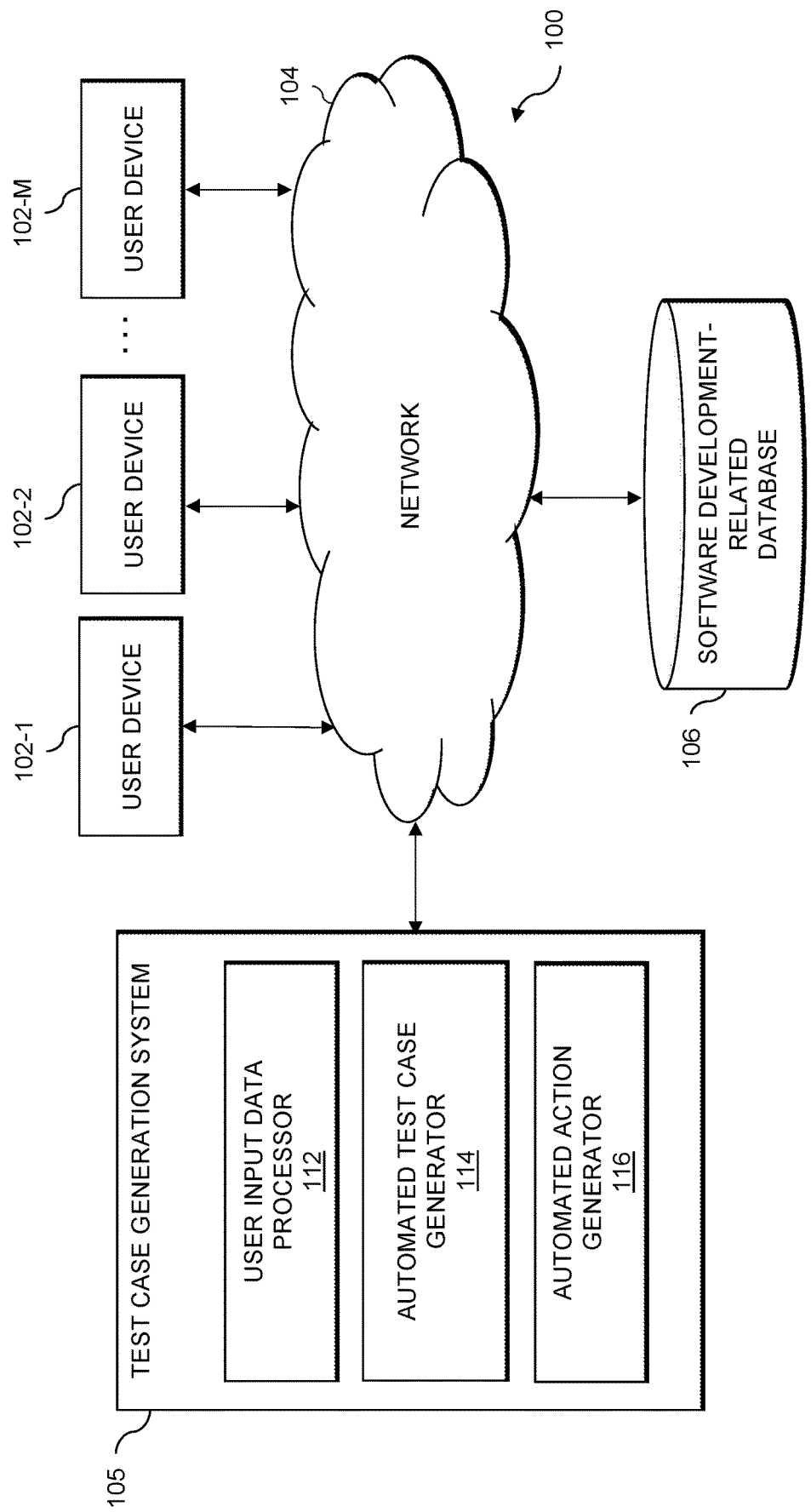
FIG. 1 shows an information processing system configured for generating test cases for software testing using machine learning techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is test case generation system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, test case generation system 105 can have an associated software development-related database 106 configured to store data pertaining to developing and testing software applications, which comprise, for example, test cases, expected results, user stories, acceptance criteria, software features, etc.

The software development-related database 106 in the present embodiment is implemented using one or more storage systems associated with test case generation system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with test case generation system 105 are one or more input-output devices, which illustratively comprise keyboards, displays or other types of input-output devices in any combination. Such input-output devices can be used, for example, to support one or more user interfaces to test case generation system 105, as well as to support communication between test case generation system 105 and other related systems and devices not explicitly shown.

Additionally, test case generation system 105 in the FIG. 1 embodiment is assumed to be implemented using at least one processing device. Each such processing device generally comprises at least one processor and an associated memory, and implements one or more functional modules for controlling certain features of test case generation system 105.

More particularly, test case generation system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows test case generation system 105 to communicate over the network 104 with the user devices 102, and illustratively comprises one or more conventional transceivers.

The test case generation system 105 further comprises user input data processor 112, automated test case generator 114, and automated action generator 116.

It is to be appreciated that this particular arrangement of elements 112, 114 and 116 illustrated in the test case generation system 105 of the FIG. 1 embodiment is presented by way of example only, and alternative arrangements can be used in other embodiments. For example, the functionality associated with elements 112, 114 and 116 in other embodiments can be combined into a single module, or separated across a larger number of modules. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for generating test cases for software testing using machine learning techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, test case generation system 105 and software development-related database 106 can be on and/or part of the same processing platform.

An exemplary process utilizing elements 112, 114 and 116 of an example test case generation system 105 in computer network 100 will be described in more detail with reference to the flow diagram of FIG. 5.

Accordingly, at least one embodiment includes generating test cases for software testing using machine learning techniques. As further detailed herein, such an embodiment includes generating test cases based at least in part on user-provided information, such as one or more user-provided stories, wherein such user-provided information can be validated based at least in part on acceptance criteria. As used herein, a user story refers to a non-technical description of at least one feature and/or at least one functionality of a software application or product, written from the perspective of at least one end user. Also, as used herein, acceptance criteria refers to at least one set of one or more specific conditions and/or requirements that a software application or product must meet to be considered complete, satisfactory, and/or accepted by at least one end user.

At least one embodiment includes automating test case generation using machine learning techniques including, for example, one or more NLP techniques. Such an embodiment includes processing one or more user stories associated with a given software application and acceptance criteria associated with the given software application to extract relevant information (e.g., by using NLP techniques such as part-of-speech (POS) tagging, dependency parsing, keyword extraction, word embedding techniques, etc.) and generate one or more test cases for the given software application based at least in part thereon (e.g., generate one or more test cases for the given software application that cover all possible scenarios). In at least one embodiment, covering one or more scenarios refers to an aim of creating one or more test cases which thoroughly examine the behavior of the given software application under various conditions, and to achieve this, the one or more test cases should encompass types of scenarios such as, e.g., one or more positive scenarios, one or more negative scenarios, one or more boundary scenarios, one or more regression scenarios, etc.

One or more embodiments include reducing and/or minimizing the need for human intervention. Such an embodiment includes obtaining and processing user stories, provided and/or generated by one or more human users, and acceptance criteria using one or more machine learning techniques (e.g., one or more NLP techniques) to extract information to be used in connection with generating one or more test cases relevant to one or more features and/or functionalities of a given software application. By way of example, the one or more generated test cases can be based at least in part on the expected functionality of the given software application and can cover and/or be associated with one or more possible scenarios.

FIG. 2 shows example pseudocode for NLP-based information extraction in an illustrative embodiment. In this embodiment, example pseudocode 200 is executed by or under the control of at least one processing system and/or device. For example, the example pseudocode 200 may be viewed as comprising a portion of a software implementation of at least part of test case generation system 105 of the FIG. 1 embodiment.

The example pseudocode 200 illustrates preprocessing user stories and acceptance criteria, which includes performing text cleaning and tokenizing one or more portions of the text. Example pseudocode 200 also illustrates performing POS tagging by assigning grammatical parts of speech to each word in the text. Also, example pseudocode 200 includes extracting relationships between words in the text, identifying keywords and/or phrases in the text, and generating one or more word embeddings to represent words in a high-dimensional vector space.

It is to be appreciated that this particular example pseudocode shows just one example implementation of NLP-based information extraction, and alternative implementations can be used in other embodiments.

At least one embodiment includes one or more data preprocessing steps. Such an embodiment can include preprocessing one or more user stories associated with a given software application, acceptance criteria associated with the given software application, and/or one or more test scenarios associated with the given software application. Such preprocessing can include, for example, data imputation, data cleaning, etc.

More specifically, in one or more example embodiments, such preprocessing includes obtaining one or more user stories and corresponding acceptance criteria information. Additionally, such an embodiment includes classifying the one or more user stories into one or more categories (e.g., one or more categories provided and/or specified by at least one subject matter expert). For example, the one or more user stories can be classified in accordance with the subject matter and/or functionality type associated with the corresponding software application (e.g., finance applications, web browsers, etc.). Such classification(s) enable(s), in one or more embodiments, actions taken for one test case and/or one software application to be extended to other similarly classified test cases and/or one software applications. Such an embodiment can also include updating at least one category store accordingly and/or as needed. Additionally, in such an embodiment, a category store holds information pertaining to and/or related to categories of the user stories, wherein such categories can be provided, for example, by one or more subject matter experts.

Also, at least one embodiment includes parsing at least a portion of the one or more user stories and corresponding acceptance criteria information and creating one or more records associated with such parsing. By way of example, at least a portion of the one or more user stories and corresponding acceptance criteria information can be parsed, using NLP techniques, into at least one noun phrase (which contains all parts prior to the first verb) and at least one verb phrase (which contains at least one verb and one or more other parts of speech). If there are one or more identifiers (e.g., an account identifier (ID), a username, etc.) present in the one or more user stories and corresponding acceptance criteria information, such identifier(s) can be extracted separately in accordance with one or more embodiments.

Additionally, in at least one embodiment, one or more parsed verb phrases can be associated with one or more predetermined topics. For example, such an associated predetermined topic can be implemented upon a determination that a user story is related to a particular type of software product, strategy, transaction, etc., and/or upon a determination that a user story is related to a particular section of requirement (e.g., software, hardware, services, etc.). As noted above, subsequent to and/or in connection with such parsing, one or more embodiments include creating at least one record related thereto, wherein such a record includes a timestamp, any parsed identifier(s), any parsed noun phrase (s), any parsed verb phrase(s), and any associated topic(s).

In connection with such created records, one or more embodiments include performing topic-based pattern discovery. In such an embodiment, the records can be grouped according to topic, and further grouped with respect to noun phrases within each given topic grouping. Additionally, in at least one embodiment, the verb phrases (which can represent action transitions) are collected and processed for the presence of one or more patterns. Such pattern discovery can include, for example, identifying instances wherein a verb phrase (e.g., a particular verb phrase, a verb phrase from a particular group or category, etc.) occurs after another verb phrase, computing the time interval associated with each such transition, and creating at least one model based at least in part thereon. In at least one embodiment, if a given computed time interval is not standard, then a discrete time function series is created that can be used to predict future instances of the transition and/or transitions similar thereto.

In connection with created records such as detailed above, one or more embodiments can also include performing entity-based pattern discovery, which can be carried out in a manner similar to the above-noted topic-based pattern discovery except that the initial grouping is performed according to the corresponding entity (e.g., software, etc.). Additionally or alternatively, at least one embodiment can include performing one or more sentiment-based pattern discoveries. For example, when search terms are analyzed, sentiment analysis can be applied on such terms and one or more sentiments can be extracted (e.g., sentiments indicative of a negative scenario or a positive scenario). The output of one or more of the above-noted pattern discoveries (e.g., topic-based pattern discovery, entity-based pattern discovery, and/or sentiment-based pattern discovery) can be associated with one or more user parameters for the corresponding software application to be tested, and used in connection with generating one or more test cases.

In one or more embodiments, discovering patterns can be carried out as follows. During a preprocessing phase, one or more NLP techniques are used to analyze user stories and acceptance criteria to extract relevant information. This process can involve, for example, POS tagging, dependency parsing, keyword extraction and word embedding techniques. These techniques help identify key elements and relationships within the textual data, such as system components, user roles, actions, objects, corresponding attributes, etc. Patterns discovered in connection therewith can be in the form, for example, of syntactic structures, semantic relationships, and/or specific keywords and phrases that frequently occur in the user stories and acceptance criteria.

As also noted above, one or more embodiments include associating patterns with user parameters. In such a context, user parameters refer to variables and/or inputs that can be manipulated to create different test scenarios based at least in part on the discovered patterns. For example, in connection with an extracted pattern of "User [X] can [perform action Y] on [object Z]," the user parameters can include different user roles (admin, guest, registered user, etc.), actions (create, read, update, delete, etc.), and objects (file, document, database entry, etc.). The associations between at least a portion of the patterns and one or more user parameters can be created during a training phase of the relevant machine learning model. The machine learning model learns to recognize one or more patterns and the corresponding user parameters from labeled training data, wherein test cases are already associated with specific user stories and acceptance criteria.

In connection with generating test cases, once the machine learning model (e.g., at least one NLP model) has learned the patterns and their associations with user parameters, the machine learning model can take new user stories and acceptance criteria as input and generate one or more test cases that cover various scenarios. The machine learning model processes the input text, identifies one or more relevant patterns, and maps the one or more patterns to one or more appropriate user parameters. By combining different user parameters, at least one embodiment can include creating a range of test cases that cover various scenarios and combinations of actions and entities. In such an embodiment, test cases can be generated in a structured format, including the specific actions, inputs, and expected outcomes, which can be directly utilized by testing frameworks.

Figure 3:
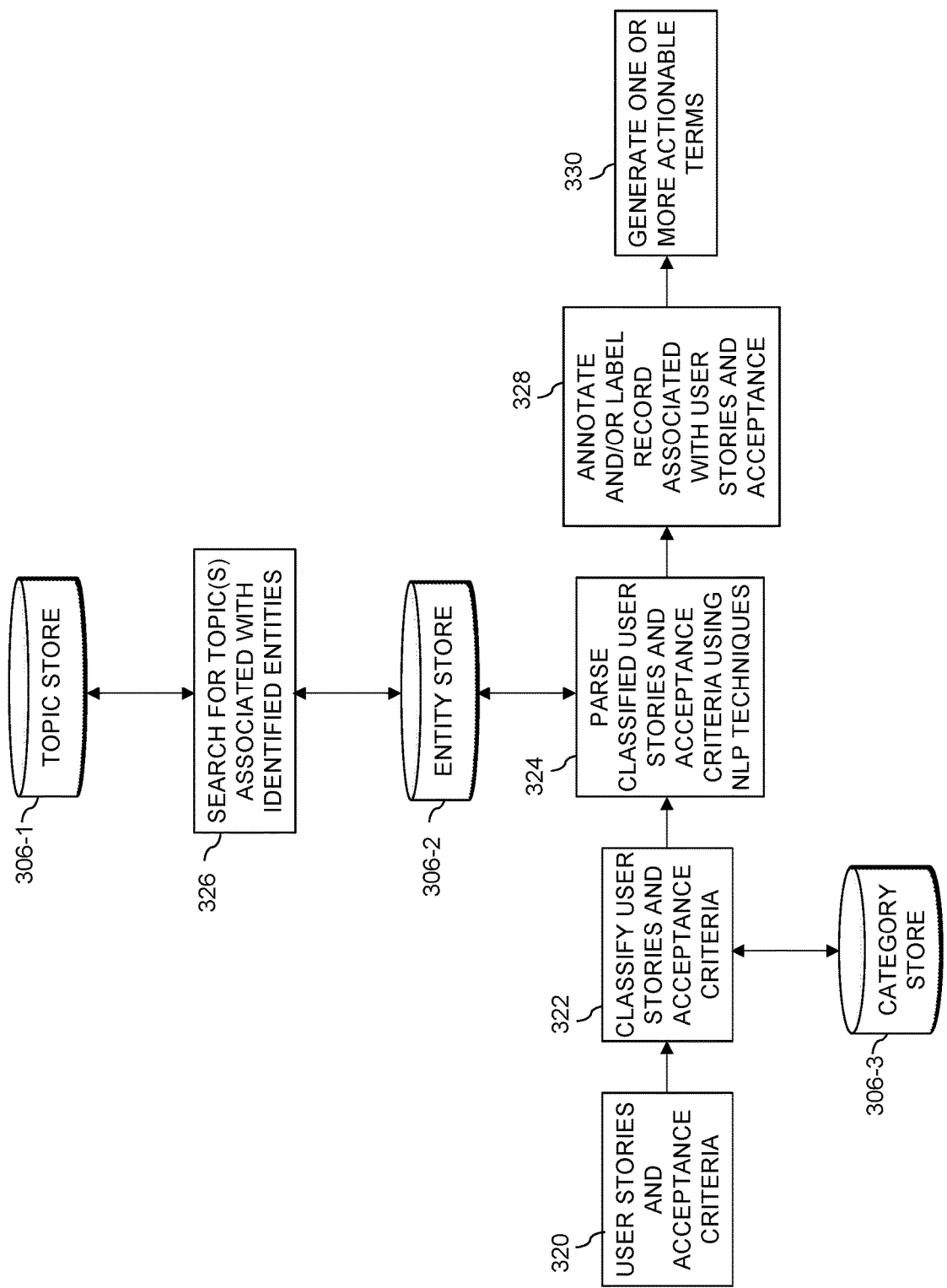
FIG. 3 shows an example workflow for generating test cases for software testing using machine learning techniques in an illustrative embodiment.

FIG. 3 shows an example workflow for generating test cases for software testing using machine learning techniques in an illustrative embodiment. By way of illustration, FIG. 3 depicts user stories and acceptance criteria 320 pertaining to at least one software application to be tested and/or being tested. In step 322, at least portions of the user stories and acceptance criteria 320 are classified into one or more categories, based at least in part on category information derived from category store 306-3 (which can include, e.g., identification of categories specified by one or more subject matter experts).

Subsequent to the classification(s) carried out in step 322, step 324 includes processing the user stories and acceptance criteria 320 using one or more natural language processing-based parsing techniques. For example, in one or more embodiments, step 324 includes identifying and removing entities and/or entity-related information from the user stories and acceptance criteria 320, and converting the remaining text into one or more noun phrases and/or one or more verb phrases. In such an embodiment, such actions can include comparing one or more identified entities against data stored in entity store 306-2, which can further include searching, in step 326, for one or more topics and/or topic-related information associated with the identified entities in topic store 306-1 (e.g., attempting to identify one or more common nouns for a given entity). Additionally, new and/or unrecognized terms associated with one or more identified entities can be added to entity store 306-2.

As also depicted in FIG. 3, step 328 includes annotating and/or labeling at least one record associated with the user stories and acceptance criteria 320. In one or more embodiments, step 328 can include annotating and/or labeling at least one record with respect to the classification(s) performed in step 322, as well as the noun phrase(s), verb phrase(s), one or more entities, one or more corresponding topics, etc. as determined and/or identified in step 324. Based at least in part on the annotating and/or labeling of the at least one record in step 328, step 330 includes generating one or more actionable terms, wherein actionable terms refer to one or more test cases (e.g., test cases generated in a structured format), including one or more specific actions, inputs, and expected outcomes, which can be directly utilized by one or more testing frameworks.

Accordingly, as detailed herein, one or more embodiments include processing input form one or more users in the form, for example, of one or more user stories associated with a given software application to be tested. In conjunction with such user input, one or more embodiments also include processing acceptance criteria information associated with the given software application to be tested, and generating one or more test cases to be used in testing the given software application based at least in part on the results of such processing.

Also, at least one embodiment can include enhancing and/or optimizing such generated test cases by incorporating entity and/or topic information. For example, such an embodiment can include implementing at least one category store, which can be created and/or updated by at least one user (e.g., at least one subject matter expert) and used to classify one or more user stories and/or acceptance criteria information as well as generate one or more test conditions and/or expected results for one or more test cases. Additionally, in one or more embodiments, relationships between software application requirements and expected text case results can be determined and/or formed using topic-based pattern discovery and/or entity-based pattern discovery.

Subsequent to categorizing one or more user stories and correspondingly updating at least one category store as needed, at least one embodiment can include performing the following actions in connection with readying at least one NLP model and using the at least one NLP model to generate one or more test cases. In at least one embodiment, such an NLP model can include, for example, POS tagging, dependency parsing, keyword extraction, word embedding techniques, etc. Also, such actions, as noted above, can include obtaining one or more user stories and corresponding acceptance criteria information for the software application and/or feature thereof being developed and/or tested. Additionally, at least a portion of the obtained data (e.g., the one or more user stories) can be preprocessed by, for example, removing one or more stop words, one or more punctuations, and/or other less relevant information. Such preprocessing can include using techniques such as, for example, tokenization, stemming, and/or lemmatization to clean the data.

Such actions also include preparing the preprocessed data for training by annotating at least a portion of the preprocessed data with one or more relevant entities and/or topics, and/or by labeling at least a portion of the one or more user stories and corresponding acceptance criteria information based at least in part on one or more respective categories (such as, e.g., functional or non-functional requirements, enterprise rules, etc.). This helps the NLP model learn to identify important information and context. Also, at least one embodiment can include updating at least one database (e.g., an entity store and/or a category store) with new and/or unrecognized terms as such terms arise during the annotation and/or labeling process.

Continuing with the above, such actions further include training the NLP model using at least a portion of the annotated and/or labeled data. Additionally, the at least one database (e.g., the entity store and/or the category store) can be utilized to refine and/or fine-tune the NLP model during one or more iterations of training. After the NLP model has been trained, at least one embodiment includes validating the NLP model by testing the NLP model on a set of unseen user stories and corresponding acceptance criteria information. Such validation can include determining whether the NLP model is able to identify one or more entities and/or topics correctly, as well as evaluating the performance of the NLP model using metrics such as, e.g., accuracy, precision, recall, and/or F1 score.

Once the NLP model is validated, at least one embodiment includes using the NLP model to generate one or more test cases based at least in part on the one or more identified entities and/or topics. In such an embodiment, the test cases can cover at least a portion of the acceptance criteria information (for example, all of the acceptance criteria) and one or more edge cases (e.g., all potential edge cases).

By way merely of example, and in conjunction to the techniques detailed in connection with FIG. 4, consider an example use case which includes the following user story: "As a registered user, I want to be able to search for products by their names and view their details." Additionally, related example acceptance criteria can include the following: "The search functionality should be accessible from the homepage;" "Users should be able to enter the product name in the search bar;" "The search results should display matching products with their names, prices, and available stock;" and "Clicking on a product should redirect users to the product details page."

FIG. 4 shows example pseudocode for generating test cases using an NLP model in an illustrative embodiment. In this embodiment, example pseudocode 400 is executed by or under the control of at least one processing system and/or device. For example, the example pseudocode 400 may be viewed as comprising a portion of a software implementation of at least part of test case generation system 105 of the FIG. 1 embodiment.

The example pseudocode 400 illustrates preprocessing text data from user stories and acceptance criteria, as well as initializing and fine-tuning an NLP model. Also, example pseudocode 400 illustrates extracting information from the user stories and acceptance criteria using the NLP model, and generating one or more test cases based at least in part on the extracted information. Additionally, example pseudocode 400 illustrates executing at least one of the one or more generated test cases, recording the results, and outputting the at least one test case based at least in part on the results.

It is to be appreciated that this particular example pseudocode shows just one example implementation of generating test cases using an NLP model, and alternative implementations can be used in other embodiments.

By way merely of example, consider the following illustrative test cases generated using an NLP model. A first test can case includes "Verify Search Functionality on Homepage," with a corresponding description of "Verify that the search functionality is accessible from the homepage." Steps of such a test case can include opening the application's homepage and locating the search bar on the homepage, while an expected outcome of the test case includes the search bar being visible and functional, allowing users to enter search queries.

A second test case can include "Test Product Search by Name," with a corresponding description of "Verify that users can search for products by their names using the search bar." Steps of such a test case can include navigating to the application's homepage, entering a valid product name (e.g., laptop) in the search bar, and pressing the enter key or clicking on the search icon. An expected outcome of the test case includes the search results page displaying matching products with their names, prices, and available stock.

As noted herein, at least one embodiment includes making use of entities and topics to generate relevant action(s) in terms of testing for each of one or more user stories. Such an embodiment can also include adapting to different types of user stories and acceptance criteria information to generate relevant test cases for a wide range of software features. One or more embodiments can also include identifying actions related to specific software applications and/or features thereof, and generalizing such actions to other software applications and/or features based, for example, on topic-based pattern discovery. Such an embodiment can then include enabling automatic responses to new and/or future features of software applications that belong to the same category. Similarly, at least one embodiment can include detecting and/or creating correlations across related test cases and/or across multiple applications based at least in part on user actions.

It is to be appreciated that some embodiments described herein utilize one or more artificial intelligence models. It is to be appreciated that the term "model," as used herein, is intended to be broadly construed and may comprise, for example, a set of executable instructions for generating computer-implemented recommendations. For example, one or more of the models described herein may be trained to recommendations in the form of test cases to be used in connection with software testing based on user stories and acceptance criteria information, and such recommendations can be used to initiate one or more automated actions (e.g., test given software applications, update given software applications, deploy given software applications, train and/or fine-tune one or more machine learning techniques, etc.).

Figure 5:
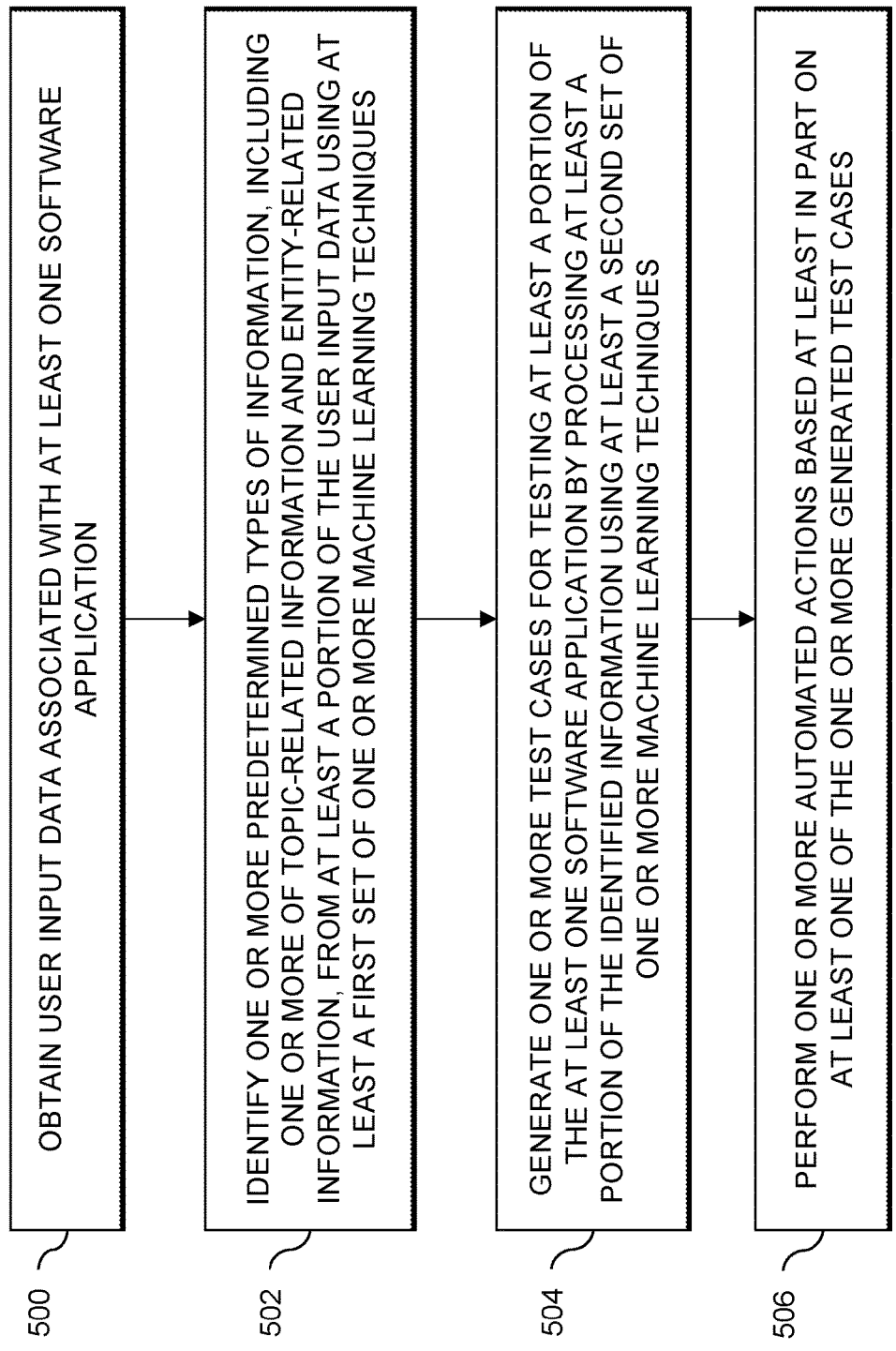
FIG. 5 is a flow diagram of a process for generating test cases for software testing using machine learning techniques in an illustrative embodiment.

FIG. 5 is a flow diagram of a process for generating test cases for software testing using machine learning techniques in an illustrative embodiment. It is to be understood that this particular process is only an example, and additional or alternative processes can be carried out in other embodiments.

In this embodiment, the process includes steps 500 through 506. These steps are assumed to be performed by test case generation system 105 utilizing elements 112, 114 and 116.

Step 500 includes obtaining user input data associated with at least one software application. In at least one embodiment, obtaining user input data associated with at least one software application includes obtaining at least one description, from a perspective of at least one end user, of at least a portion of the at least one software application. Additionally, in one or more embodiments, obtaining user input data associated with at least one software application includes obtaining at least one set of one or more conditions that the at least one software application must meet to be accepted by at least one end user.

Step 502 includes identifying one or more predetermined types of information, comprising one or more of topic-related information and entity-related information, from at least a portion of the user input data using at least a first set of one or more machine learning techniques. Also, in at least one embodiment, the techniques depicted in FIG. 5 can include updating at least one database (e.g., a topic store or an entity store) using at least one of the identified topic-related information and the identified entity-related information.

In one or more embodiments, identifying one or more predetermined types of information from at least a portion of the user input data includes classifying, using the at least a first set of one or more machine learning techniques, one or more portions of the user input data into one or more predetermined categories based at least in part on one or more of subject matter associated with the at least one software application and functionality associated with the at least one software application. In such an embodiment, identifying one or more predetermined types of information from at least a portion of the user input data can include parsing, using the at least a first set of one or more machine learning techniques, at least one of entity-related information and one or more topic-related information from the one or more classified portions of the user input data.

Additionally or alternatively, identifying one or more predetermined types of information from at least a portion of the user input data can include parsing, using the at least a first set of one or more machine learning techniques, the one or more classified portions of the user input data into at least one noun phrase and at least one verb phrase. In such an embodiment, identifying one or more predetermined types of information from at least a portion of the user input data can include performing, in connection with the at least one noun phrase and the at least one verb phrase, at least one of one or more topic-based pattern discovery techniques, one or more entity-based pattern discovery techniques, and one or more sentiment-based pattern discovery techniques.

Step 504 includes generating one or more test cases for testing at least a portion of the at least one software application by processing at least a portion of the identified information using at least a second set of one or more machine learning techniques. In at least one embodiment, generating one or more test cases includes processing at least a portion of the identified information using at least one natural language processing model in connection with one or more implementation scenarios associated with the at least one software application.

In one or more embodiments, the first set of one or more machine learning techniques and the second set of one or more machine learning techniques include at least one common machine learning technique. For example, in such an embodiment, the first set of one or more machine learning techniques includes an NLP model, and the second set of one or more machine learning techniques can include the same NLP model, a different NLP model, or a similar NLP model containing an overlap in techniques. By way of further example, in at least one embodiment, the first set of one or more machine learning techniques can include an NLP model (e.g., bidirectional encoder representations from transformers (BERT), robustly optimized BERT pretraining approach (ROBERTa), XLnet, generative pre-trained transformer 3 (GPT-3), etc.) trained and/or configured to combine POS tagging, dependency parsing, keyword extraction and word embedding techniques (e.g., such as detailed in connection with FIG. 2). In such an embodiment, the second set of one or more machine learning techniques can include an NLP model (e.g., BERT, ROBERTa, XLnet, GPT-3, etc.) trained on labeled data (e.g., one or more labeled user stories and/or one or more labeled acceptance criteria) to extract relevant information from input data (e.g., one or more user story inputs and/or one or more acceptance criteria inputs) and generate one or more based at least in part on the extracted information (e.g., such as detailed in connection with FIG. 4). For example, such an NLP model can be trained (e.g., on labeled data such as noted above) to learn patterns associated with one or more user parameters relevant to software development, and once trained, the NLP model can process input text, identify one or more relevant patterns in the input text, and map the one or more patterns to one or more appropriate user parameters. By combining different user parameters, such an NLP model can generate a range of test cases that cover various scenarios.

Step 506 includes performing one or more automated actions based at least in part on at least one of the one or more generated test cases. In one or more embodiments, performing one or more automated actions includes automatically executing at least one of the one or more generated test cases in connection with testing the at least one software application. Also, in at least one embodiment, performing one or more automated actions includes automatically training at least one of the first set of one or more machine learning techniques and the second set of one or more machine learning techniques using feedback related to the at least one of the one or more generated test cases. Additionally or alternatively, performing one or more automated actions can include labeling at least a portion of the identified information, and automatically training at least one of the first set of one or more machine learning techniques and the second set of one or more machine learning techniques using the labeled information.

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to generate test cases for software testing using machine learning techniques. These and other embodiments can effectively overcome problems associated with time-consuming and error-prone conventional techniques.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
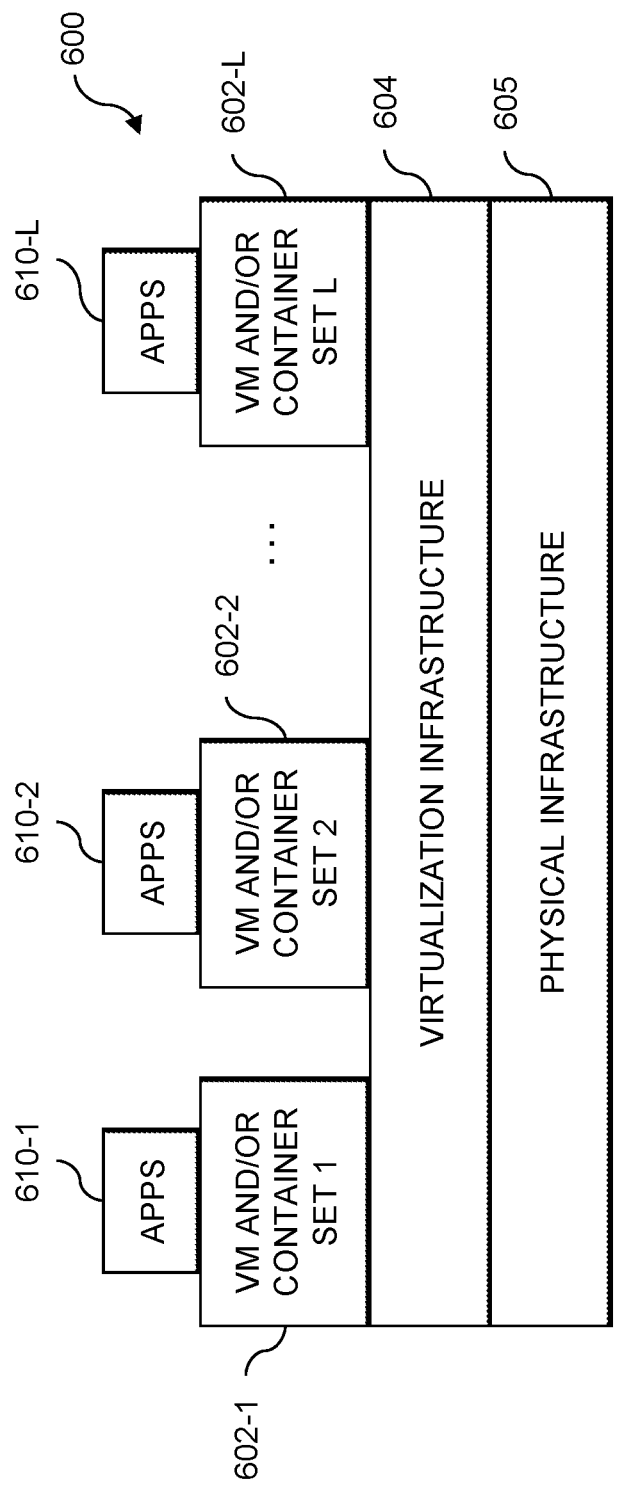
FIGS. 6 and 7 show examples of processing platforms that may be utilized to implement at least a portion of an information processing system in illustrative embodiments.
Figure 7:
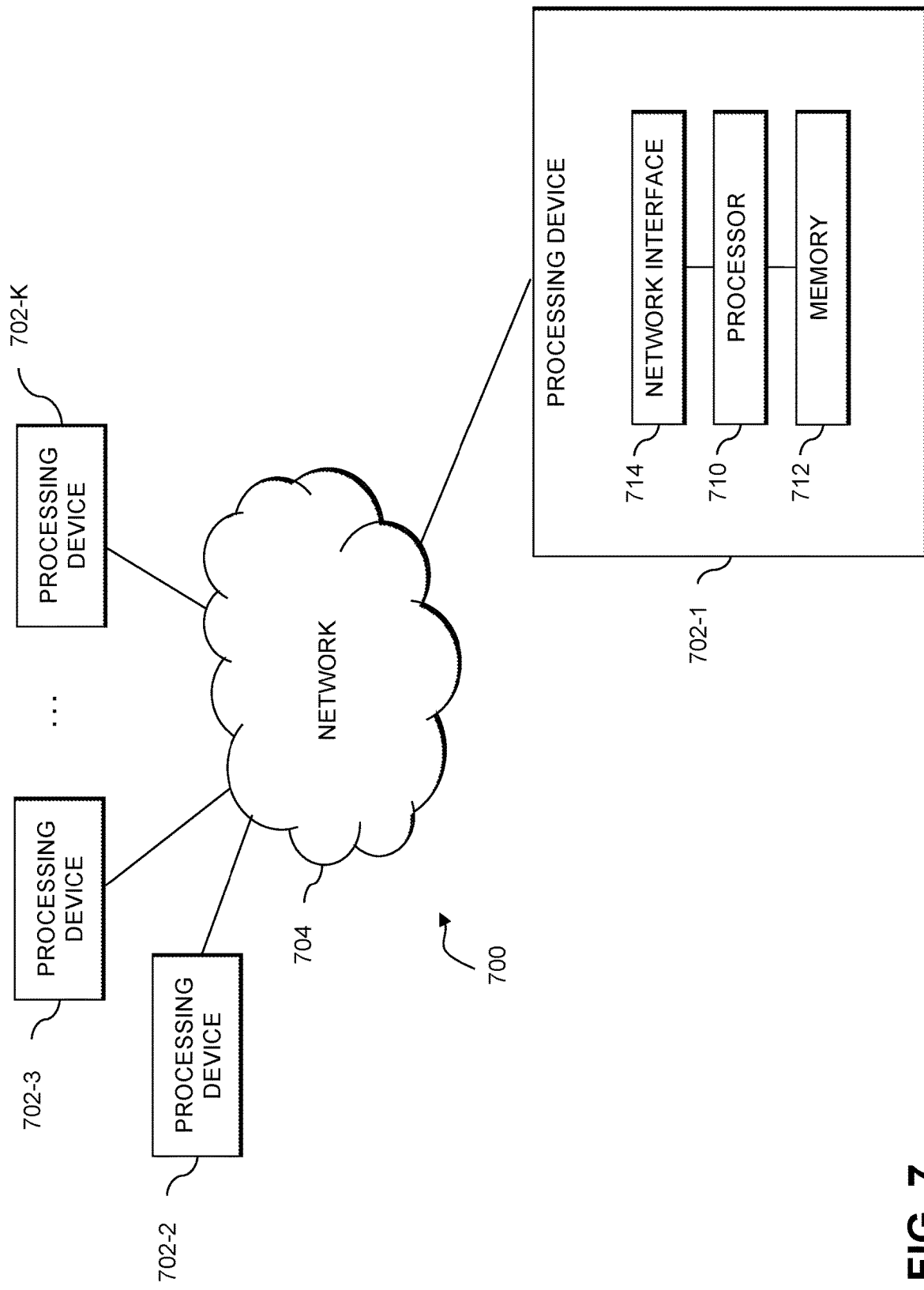

FIG. 6 shows an example processing platform comprising cloud infrastructure 600. The cloud infrastructure 600 comprises a combination of physical and virtual processing resources that are utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

A hypervisor platform may be used to implement a hypervisor within the virtualization infrastructure 604, wherein the hypervisor platform has an associated virtual infrastructure management system. The underlying physical machines comprise one or more information processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 comprises a microprocessor, a CPU, a GPU, a TPU, a microcontroller, an ASIC, a FPGA or other type of processing circuitry, as well as portions or combinations of such circuitry elements.

The memory 712 comprises random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   obtaining user input data associated with at least one software application;
   identifying one or more predetermined types of information, comprising one or more of topic-related information and entity-related information, from at least a portion of the user input data using at least a first set of machine learning techniques;
   generating one or more test cases for testing at least a portion of the at least one software application by processing at least a portion of the identified information using at least a second set of machine learning techniques, wherein the first set of machine learning techniques and the second set of machine learning techniques collectively comprise (i) at least one machine learning technique included in both the first set and the second set, and (ii) at least one machine learning technique not included in both the first set and the second set; and
   performing one or more automated actions based at least in part on at least one of the one or more generated test cases, wherein performing one or more automated actions comprises automatically executing at least one of the one or more generated test cases in connection with testing the at least one software application;
   wherein the method is performed by at least one processing device comprising a processor coupled to a memory.

2. The computer-implemented method of claim 1, wherein identifying one or more predetermined types of information from at least a portion of the user input data comprises classifying, using the at least a first set of machine learning techniques, one or more portions of the user input data into one or more predetermined categories based at least in part on one or more of subject matter associated with the at least one software application and functionality associated with the at least one software application.

3. The computer-implemented method of claim 2, wherein identifying one or more predetermined types of information from at least a portion of the user input data comprises parsing, using the at least a first set of machine learning techniques, at least one of entity-related information and one or more topic-related information from the one or more classified portions of the user input data.

4. The computer-implemented method of claim 2, wherein identifying one or more predetermined types of information from at least a portion of the user input data comprises parsing, using the at least a first set of machine learning techniques, the one or more classified portions of the user input data into at least one noun phrase and at least one verb phrase.

5. The computer-implemented method of claim 4, wherein identifying one or more predetermined types of information from at least a portion of the user input data comprises performing, in connection with the at least one noun phrase and the at least one verb phrase, at least one of one or more topic-based pattern discovery techniques, one or more entity-based pattern discovery techniques, and one or more sentiment-based pattern discovery techniques.

6. The computer-implemented method of claim 1, wherein generating one or more test cases comprises processing at least a portion of the identified information using at least one natural language processing model in connection with one or more implementation scenarios associated with the at least one software application.

7. The computer-implemented method of claim 1, wherein obtaining user input data associated with at least one software application comprises obtaining at least one description, from a perspective of at least one end user, of at least a portion of the at least one software application.

8. The computer-implemented method of claim 1, wherein obtaining user input data associated with at least one software application comprises obtaining at least one set of one or more conditions that the at least one software application must meet to be accepted by at least one end user.

9. The computer-implemented method of claim 1, wherein performing one or more automated actions comprises automatically training at least one of the first set of machine learning techniques and the second set of machine learning techniques using feedback related to the at least one of the one or more generated test cases.

10. The computer-implemented method of claim 1, wherein performing one or more automated actions comprises:
   labeling at least a portion of the identified information; and
   automatically training at least one of the first set of machine learning techniques and the second set of machine learning techniques using the labeled information.

11. The computer-implemented method of claim 1, further comprising:
   updating at least one database using at least one of the identified topic-related information and the identified entity-related information.

12. A non-transitory processor-readable storage medium having stored therein program code of one or more software programs, wherein the program code when executed by at least one processing device causes the at least one processing device:
   to obtain user input data associated with at least one software application;
   to identify one or more predetermined types of information, comprising one or more of topic-related information and entity-related information, from at least a portion of the user input data using at least a first set of machine learning techniques;
   to generate one or more test cases for testing at least a portion of the at least one software application by processing at least a portion of the identified information using at least a second set of machine learning techniques, wherein the first set of machine learning techniques and the second set of machine learning techniques collectively comprise (i) at least one machine learning technique included in both the first set and the second set, and (ii) at least one machine learning technique not included in both the first set and the second set; and
   to perform one or more automated actions based at least in part on at least one of the one or more generated test cases, wherein performing one or more automated actions comprises automatically executing at least one of the one or more generated test cases in connection with testing the at least one software application.

13. The non-transitory processor-readable storage medium of claim 12, wherein identifying one or more predetermined types of information from at least a portion of the user input data comprises classifying, using the at least a first set of machine learning techniques, one or more portions of the user input data into one or more predetermined categories based at least in part on one or more of subject matter associated with the at least one software application and functionality associated with the at least one software application.

14. The non-transitory processor-readable storage medium of claim 12, wherein generating one or more test cases comprises processing at least a portion of the identified information using at least one natural language processing model in connection with one or more implementation scenarios associated with the at least one software application.

15. An apparatus comprising:
   at least one processing device comprising a processor coupled to a memory;
   the at least one processing device being configured:
      to obtain user input data associated with at least one software application;
      to identify one or more predetermined types of information, comprising one or more of topic-related information and entity-related information, from at least a portion of the user input data using at least a first set of machine learning techniques;
      to generate one or more test cases for testing at least a portion of the at least one software application by processing at least a portion of the identified information using at least a second set of machine learning techniques, wherein the first set of machine learning techniques and the second set of machine learning techniques collectively comprise (i) at least one machine learning technique included in both the first set and the second set, and (ii) at least one machine learning technique not included in both the first set and the second set; and
      to perform one or more automated actions based at least in part on at least one of the one or more generated test cases, wherein performing one or more automated actions comprises automatically executing at least one of the one or more generated test cases in connection with testing the at least one software application.

16. The apparatus of claim 15, wherein identifying one or more predetermined types of information from at least a portion of the user input data comprises classifying, using the at least a first set of machine learning techniques, one or more portions of the user input data into one or more predetermined categories based at least in part on one or more of subject matter associated with the at least one software application and functionality associated with the at least one software application.

17. The apparatus of claim 15, wherein generating one or more test cases comprises processing at least a portion of the identified information using at least one natural language processing model in connection with one or more implementation scenarios associated with the at least one software application.

18. The apparatus of claim 15, wherein obtaining user input data associated with at least one software application comprises obtaining at least one description, from a perspective of at least one end user, of at least a portion of the at least one software application.

19. The apparatus of claim 15, wherein obtaining user input data associated with at least one software application comprises obtaining at least one set of one or more conditions that the at least one software application must meet to be accepted by at least one end user.

20. The apparatus of claim 15, wherein performing one or more automated actions comprises automatically training at least one of the first set of machine learning techniques and the second set of machine learning techniques using feedback related to the at least one of the one or more generated test cases.

* * * * *